US00RE42102E

(19) United States
(12) Reissued Patent
Kopchik

(10) Patent Number: US RE42,102 E
(45) Date of Reissued Patent: Feb. 1, 2011

(54) METHOD AND APPARATUS FOR WIRELESSLY ESTABLISHING USER PREFERENCE SETTINGS ON A COMPUTER

(75) Inventor: Kurt Kopchik, Great Neck, NY (US)

(73) Assignee: LPC II Holdings, LLC, Dover, DE (US)

(21) Appl. No.: 12/371,465

(22) Filed: Feb. 13, 2009

Related U.S. Patent Documents

Reissue of:
(64) Patent No.: 7,177,915
Issued: Feb. 13, 2007
Appl. No.: 10/331,553
Filed: Dec. 31, 2002

(51) Int. Cl.
*G06F 15/16* (2006.01)

(52) U.S. Cl. ..... 709/217; 709/228; 726/4
(58) Field of Classification Search ..... 709/217, 709/228; 726/4
See application file for complete search history.

(56) References Cited

U.S. PATENT DOCUMENTS

| | | | |
|---|---|---|---|
| 5,630,159 | A | 5/1997 | Zancho |
| 5,694,471 | A | 12/1997 | Chen et al. |
| 5,757,918 | A | 5/1998 | Hopkins |
| 5,960,085 | A | 9/1999 | de la Huerga |
| 5,983,273 | A | 11/1999 | White et al. |
| 6,145,023 | A | 11/2000 | Iwasaki |
| 6,199,114 | B1 | 3/2001 | White et al. |
| 6,259,769 | B1 | 7/2001 | Page et al. |
| 6,310,581 | B1 | 10/2001 | Stockhammer |
| 6,370,650 | B1 | 4/2002 | Cromer et al. |
| 6,400,823 | B1 | 6/2002 | Angelo |
| 6,501,962 | B1 | 12/2002 | Green |
| 6,792,464 | B2 | 9/2004 | Hendrick |
| 6,959,318 | B1 | 10/2005 | Tso |
| 2001/0042212 | A1 | 11/2001 | Du et al. |
| 2002/0029348 | A1 | 3/2002 | Du et al. |
| 2003/0028814 | A1 | 2/2003 | Carta et al. |
| 2003/0115038 | A1 | 6/2003 | Want et al. |
| 2003/0204296 | A1 | 10/2003 | Galli et al. |
| 2004/0225776 | A1 | 11/2004 | DiRaimondo et al. |

OTHER PUBLICATIONS

"StorCard Improves Productivity and Reduces Cost for the Mobile Enterprise Without Compromise", http://www.storcard.com (viewed on May 14, 2003).
"Migo by Forward Solutions, Inc.", http://www.4migo.com (viewed on Feb. 18, 2004).

*Primary Examiner*—Kenny S Lin
(74) *Attorney, Agent, or Firm*—Knobbe Martens Olson & Bear LLP

(57) ABSTRACT

A method and apparatus for establishing preference settings for a computer during a user session. The apparatus includes the computer coupled to a smart card reader configured to wirelessly detect and access a smart card located within a predetermined zone of the smart card reader. The smart card carries personalized preference settings and unique identification information such that the preference settings are temporarily assigned to the computer when the smart card is within the predetermined zone. The preference settings are updated and stored on the smart card upon departure from the predetermined zone.

36 Claims, 4 Drawing Sheets

METHOD AND APPARATUS FOR WIRELESSLY ESTABLISHING USER PREFERENCE SETTINGS ON A COMPUTER

Matter enclosed in heavy brackets [ ] appears in the original patent but forms no part of this reissue specification; matter printed in italics indicates the additions made by reissue.

BACKGROUND OF THE INVENTION

There is great potential for increasing a user's productivity and comfort level by creating a more personalized computing experience. Currently, most users change few or none of the default operating system settings. Users stick with the default settings each time a new system is used because of the inconvenience of configuring a computing environment. A physical disability preventing a user from changing the settings or a lack of knowledge on how to do this are among the other reasons why a user may remain with the default settings.

The current computer desktop environment stores one profile of settings for each account on the system. If a user of one computer wants his or her custom settings on another computer, there are currently two options. The user can create an account on the other computer and then customize the settings of the new account or the user can use an existing account on the other computer and manually change the settings as desired. The first option requires a user with the proper access to create an account. The user must then customize the environment. If this computer is located in a public setting, it may not be practical to create an account for so many one-time users. The problem with the second option is that once the settings are changed, each subsequent user is forced to conform to these settings or change them again. Either scenario discourages users from customizing their computing environment.

SUMMARY OF THE INVENTION

An object of this invention is to allow a user to temporarily change settings, which have no impact on system security, to the custom settings that a user desires. The custom settings allow for instant familiarity, thereby resulting in increased productivity and less extraneous accounts. Unlike the current computing environment, a user does do not need to have a profile or an account on the computer, and can automatically and transparently use the desired settings.

Another object of this invention is to allow for the personalization of an Internet environment. Many websites require a logon and password for access. If a user has logged on from the same computer before, it is possible that this information is stored on the hard drive as a cookie allowing the user to bypass the logon process. If the user were to go to another computer, it would be necessary for the user to logon to verify the user's identity. This invention allows the logon information to be stored on the card and used on any computer. The viewed website will signal the web browser to execute a program that will determine if any cards are in a predetermined range. Upon detection of a card within the predetermined range, and if a card is in range and contains an account for that website, the user can transparently be logged on. Otherwise, the normal prompt for a user name and password appears.

The ability to transparently import the information stored on the card into the current computing environment creates the impression to the user that they have an account on the computer. Every computer that the user accesses will have the same look and feel that they are accustomed to. The ability to store email address and Internet favorites in addition to other data on the card allows users to have their personal list of email addresses at their fingertips regardless of which computer they are using.

In one embodiment of the invention, a contact smart is card is employed. The contact smart card only requires users to insert their card into the reader when they arrive and remove it when they depart. A contactless smart card permits users to keep the card in their wallet or in close proximity to the reader. When the user is within the predetermined range of the reader, the settings will automatically be established on the corresponding computer, and when the user leaves the range, the settings will automatically revert back to predetermined settings.

An advantage to this invention is that it assists disabled individuals with their computing experience. There are many people who have trouble using a computer due to disabilities such as colorblindness, bad vision and poor dexterity. Some operating systems do provide mechanisms to assist these users; however, accessibility software requires the user to reconfigure such personalized settings each time a new computer is used. For example, the Microsoft Windows operating system comes with accessibility software, but a user dependent on this software can use only a PC on which those settings are currently active. If a user has poor vision or color blindness he or she can use the accessibility software to make the colors on the screen appear in high contrast mode. This setting now allows the user to be productive on a computer despite his or her disability. The problem with this setup is that the disabled user cannot use any computer, they either need to struggle with the computer to set the desired accessibility settings, or obtain assistance from others to properly configure the computer.

Another problem is that a user is unable to then port his or her desired settings from PC to PC. If a disabled user were to use a public computer at a library he or she would have to go through the process of setting up the accessibility features every time the computer was used. This would be a great burden on the user and on the people who may be required to repeatedly assist in this process This invention would allow disabled individuals to configure their smart card settings only once, or buy a preconfigured smart card, and then have all computers automatically switch to a mode where they are able to use the computer with no assistance from others. A user with poor dexterity can now setup the mouse and keyboard settings only once on their smart card and have every computer they use after that change to the desired settings with no further interaction by the user. Not only would this make life easier for individuals with disabilities, it would also increase their interaction with computers because they will no longer require assistance to operate a computer.

This invention also has the advantage of assisting individuals with making their computing experience more comfortable and intuitive. For example, most computers by default are setup to work with a right-handed mouse. Left-handed individuals are forced to conform to the mouse button setup for right-handed person or reconfigure the computer to operate with left-handed mouse buttons. This invention will now allow left-handed people to sit down at any computer and have the mouse buttons transparently switch. This increased comfort level for users can also be realized in a multicultural computing environment. Personal settings can be used to specify the language that a user wishes to be displayed on the computer. This would be of aid to travelers at airports and other locations with people of varying languages. A user at an airport computer who is purchasing tickets can have the ticket information and prices automatically displayed in the language specified on their smart card.

DETAILED DESCRIPTION OF THE INVENTION

In a preferred embodiment of the present invention, personalized preference settings are stored on a smart card or other data carrier. Preferably, the smart card will have a similar look and feel to that of a credit card. The card format allows users to save their settings to a card for facile transportation and concealment.

In one embodiment, the smart card is contactless, meaning that it is not required to insert or physically couple with a receiver. In such an embodiment, the smart card can be left in a wallet the card and will not require removal for a receiver to detect and access. Current contactless cards communicate with the receiver through radio frequency but another wireless method may be used to transfer the data from the smart card to the receiver. The combination of the card format and wireless communication enables the card to easily travel with and be used without any intervention by the user. The card can also have contacts, which would require a user to insert the card into the reader.

In another embodiment, the card can be a combination of a contact and contactless card allowing for operation with both types of readers. The cards can also come in the formats of read-only and read-write, and can vary in their storage capabilities. As smart card technology advances, card memory capacity will grow allowing users to store even more information.

The data stored on the smart card may also be compressed to allow for greater storage.

There are a numerous settings that this invention can store on a smart card for automatic retrieval and configuration on another computer.

Figure 6:
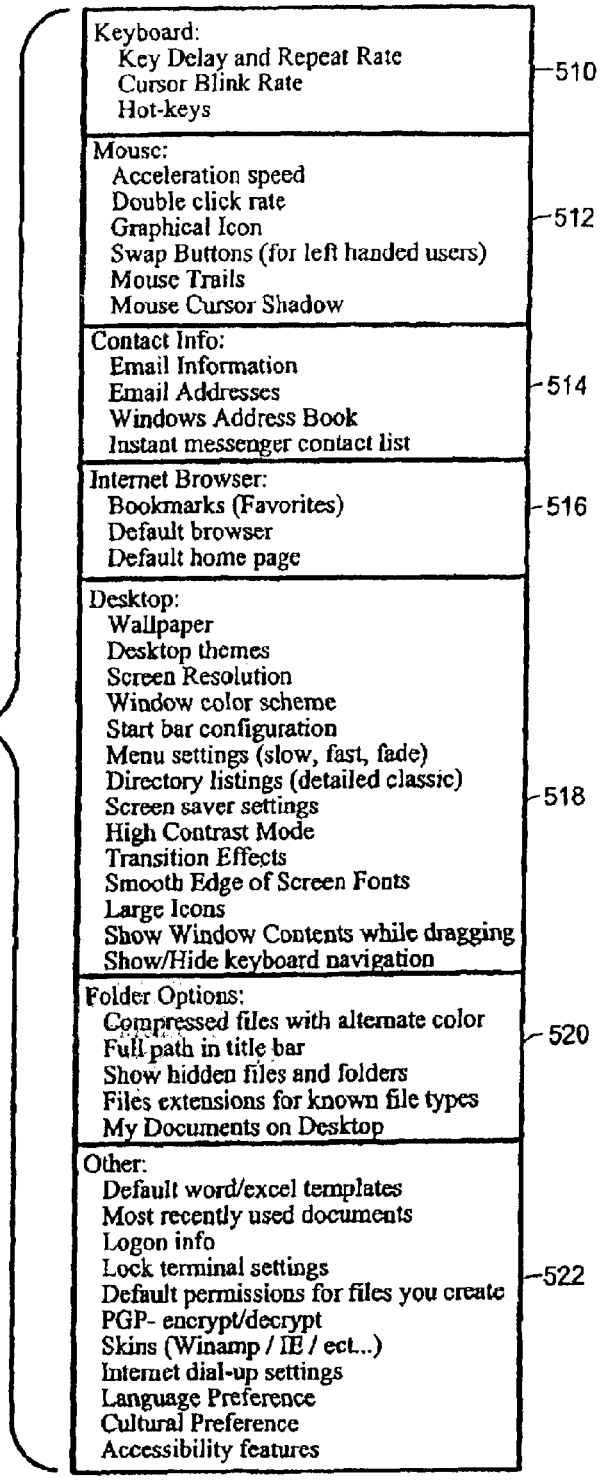
FIG. 6 illustrates a block diagram of the settings information file of the settings device layout of FIG. 5.

As shown in FIG. 6, some of the broad categories of settings include settings for the mouse 512, keyboard 510, Internet browser 516, desktop 518, file system 520, and contact information 514. These categories are just a small sample of the possible categories of settings that can be configured. Very detailed configurations can be made within these and other categories. For example, the keyboard can be configured to respond to hot-keys, which are combinations of keys that cause an action to occur such as the launching of a program. Other details such as the sensitivity of the keys and the rate at which characters repeat when a key is held down are also configurable. The mouse can be configured to show trails when it moves to allow for users to easily track its movement. The rate at which a mouse cursor moves on the screen, the button configuration and the rate at which a user must click the mouse twice for it to be considered a double click are just a few of the mouse features that can be configured.

As further shown in FIG. 6, email applications and address books can be configured to contain another users personal contact information such as email addresses, phone numbers and online chat buddy lists. An Internet browser such as Netscape can be configured start with a particular webpage and contain a list of shortcuts to frequently visited websites. A user's desktop can be setup to display a certain wallpaper and color scheme. The screen resolution along with type style of icons to use can also be configured. The file system view can be arranged to display compressed files with different colors or to list the time and date details for each file along with the filename. There are many other settings that can be configured such as the language to use, the default font style for word processing, and the speaker volume just to name a few.

Figure 1:
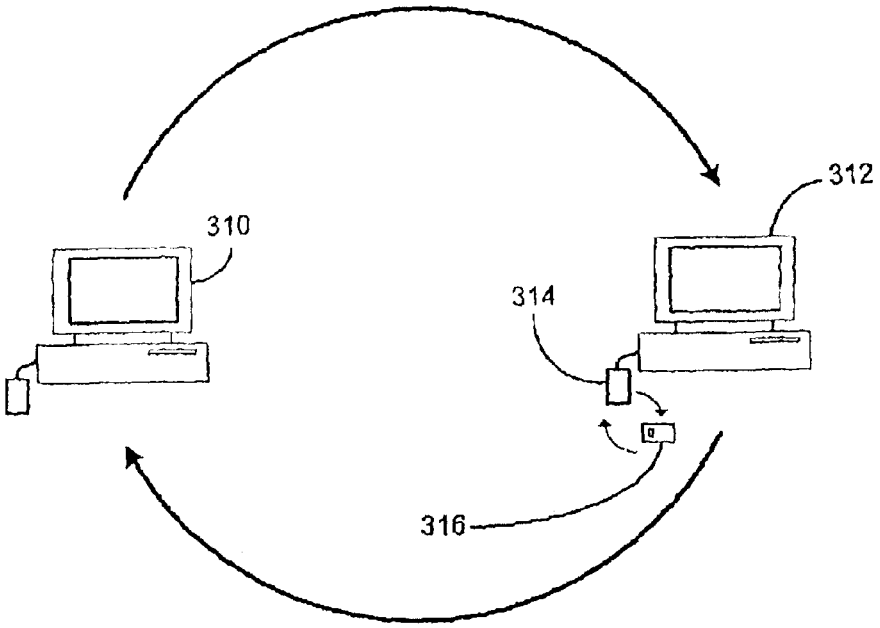
FIG. 1 illustrates a system for establishing preference settings on a computer system according to one embodiment of the present invention.

As shown in FIG. 1, a system of the present invention includes computers 310, 312 connected to smart card readers or receivers 314 which are hooked to a port on the computers 310, 312. This port should be a USB port or another type of technology that allows for plug and play capabilities. The smart card readers 314 are arranged to constantly poll the area around the computer for the existence of any smart cards at preselected intervals. In the case of contactless smart cards, users can specify the range in which the device would check for cards. Users can also specify the frequency with which the device checks for the presence of a smart card. In a low traffic environment such as a home PC, users may want to only check for the presence of a card every second, while in a high traffic environment the system can be configured to check for a card every tenth of a second.

Figure 2:
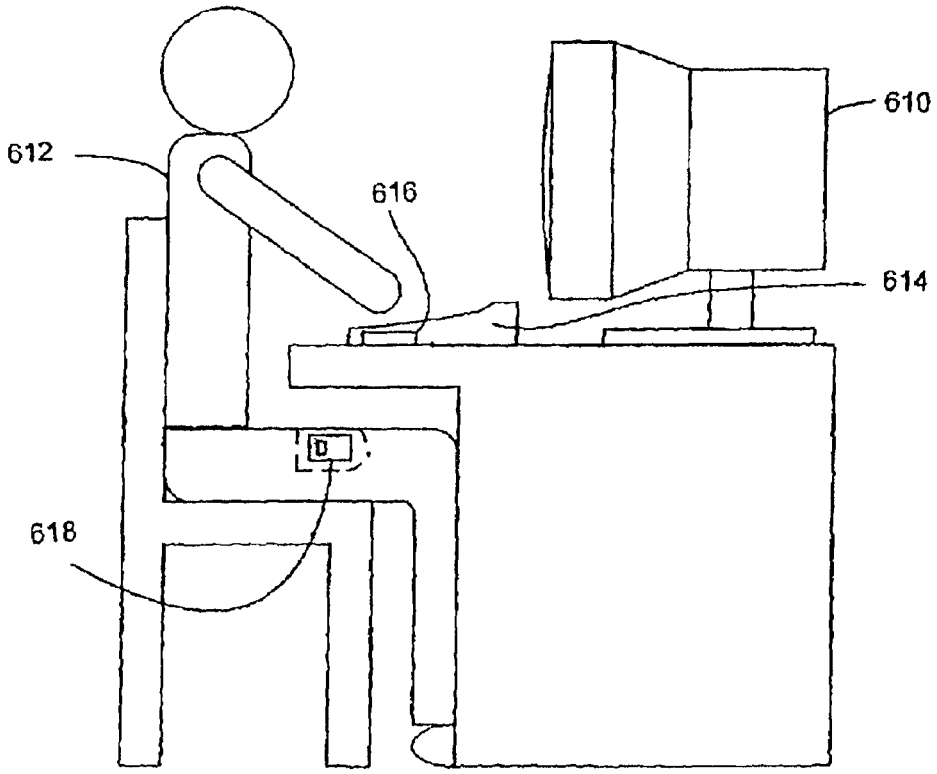
FIG. 2 illustrates a system for wirelessly establishing preference settings on a computer according one embodiment of the present invention

The reader 314 should be placed within close proximity to the computer 310, 312 to allow it to detect when a user intends to use the computer 310, 312. As illustrated in FIG. 2, it is possible to integrate the smart card reader 616 into the keyboard 614 allowing it to always be in close range to a user 612. The placement of the reader 616 into the keyboard 614 would also be an excellent location for detecting a smart card 618 if users 612 keep the card in their wallet. Once a card is detected, the information containing how to personalize the computer settings 420, as shown in FIG. 6, would be read from the card and transferred to the computer software.

If two contactless cards come in the range of the receiver 616 at the same time while another smart card is not currently in use, anti-collision handling software would determine which card is selected. Users also have the option to turn the receiver 616 off or, if more than one card is within range of the receiver 616, manually switch the card being read. Once smart cards settings are loaded, those settings remain the dominant settings until that card leaves the range of the reader, the user chooses to switch manually to another smart card, or the user decides to manually revert to the original system settings and not use smart card settings.

The software system is composed of four components. The first component consists of the interface between the card and the computer. The interface is designed to be compatible with the Personal Computer/Smart Card (PC/SC) standard or any other industry standard that may replace it in the future. The use of the PC/SC standard enables the software to be interoperable with any card/receiver combination that conforms to the standard. The second component reads the settings from the card and modifies the computer environment to reflect these new settings. This component runs in the background on the computer. It would run as a service on the Microsoft Windows Operating System environment. Running this component as a service allows the software to be active across multiple accounts while providing it the proper access privileges to change the desired settings. The third component is an easy to use graphical interface that allows a user to easily customize settings and save those settings to the device for later use. This component would also allow users to modify and view which settings are currently contained on a smart card. The fourth software component handles the protocol used to allow the card to interact with the Internet. More specifically, it allows users to transparently logon to Internet sites using information stored on the smart card in conjunction with software integrated into a web browser and website.

Figure 3:
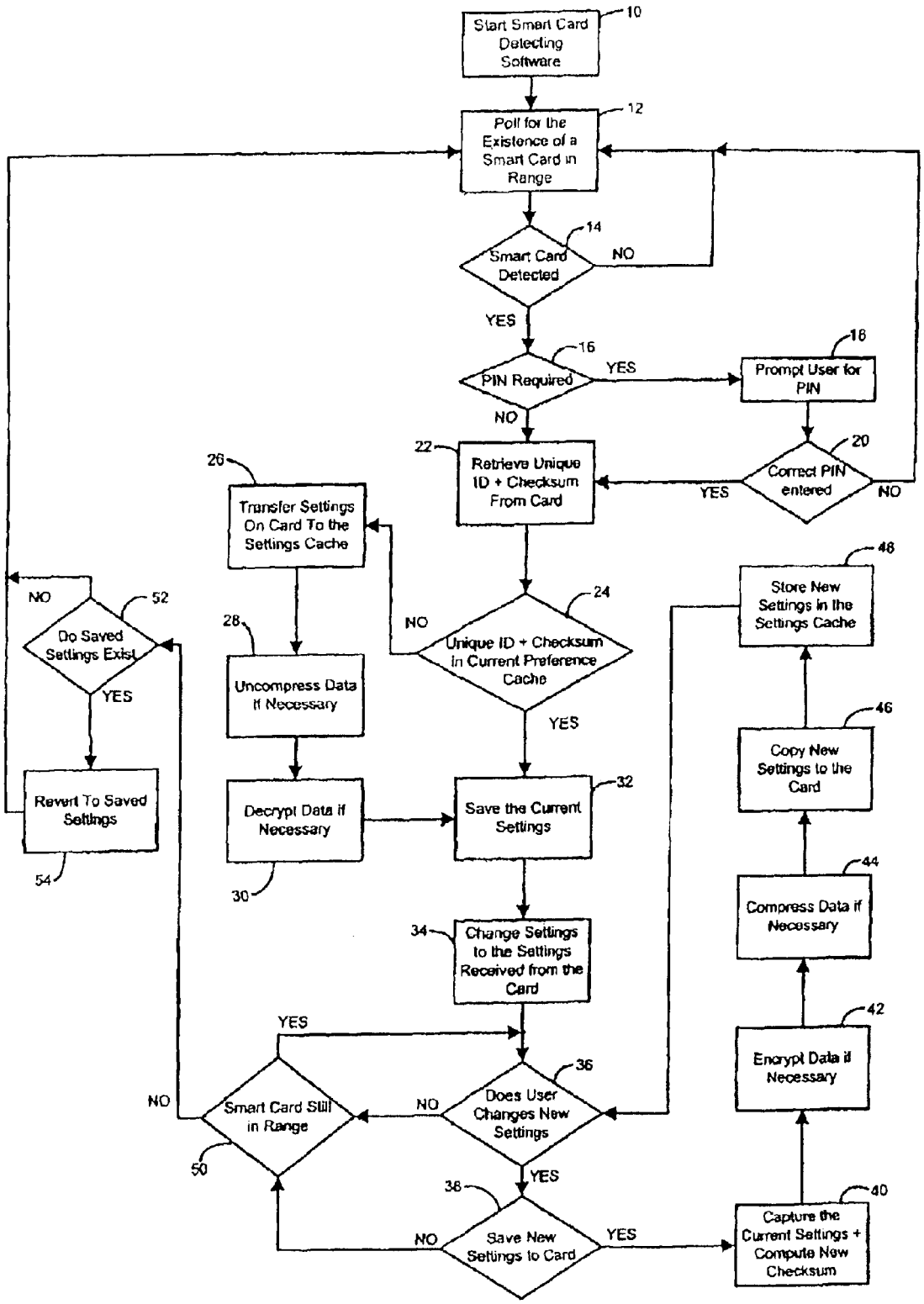
FIG. 3 is a flow diagram illustrating the establishment of user preference settings on a computer.

As demonstrated in the flow chart of FIG. 3, after users install the smart card reader and the software 10 pertaining to this invention, the system will be ready to accept personalized settings contained on a smart card. An icon will appear in the system tray indicating the current smart card settings status of the system. This icon changes its status according to whether the smart card system is currently scanning for smart cards, suspended, transferring data from or to a smart card, or actively using smart card settings. When settings from a smart card are not currently in use, the system, by default, scans 12 for the presence of cards.

The predetermined range in which the reader scans will come with a default setting that is applicable to most environments, but users will be able to adjust this setting if desired. Once a smart card is detected 14 by the reader, the software attempts to retrieve 22 the unique ID and checksum of the data contained on the card. If the owner of the smart card decided to encrypt the data contained on the card, he or she would be prompted 18 and required to enter the proper personal identification number (PIN) to proceed with the transfer of information from the card. It is envisioned that most users will have no desire to protect their personal settings, so in the majority of cases no user interaction would be required to transfer the settings from the card to the computer. The reason why most users would most likely choose not to protect the settings with a PIN is because the settings data being transferred would not be sensitive information. Not many people will be concerned with protecting their preferred mouse speed or font style.

The system is also capable of transferring the settings on the card to the computer with no PIN while having other information on the card, which is not automatically transferred, protected by a PIN. This allows the user to enjoy the ease of automatically switching settings, while still allowing for other information to be password protected and only transferred upon request by the user at which time they will be required to enter a PIN.

Once the software receives 22 the unique ID and data checksum from the smart card, it inspects 24 the settings cache on the computer to see if this user has previously altered the settings. Each card contains a globally unique identifier (GUID) 412 that uniquely identifies the card.

A GUID is an alphanumeric identifier that is unique across time and space. The card also contains a current checksum 414 of the all data contained on it. The GUID 412 and checksum 414 are used to implement a local caching system to allow for a faster transfer and configuration of the settings. When the receiver detects 14 a card, it obtains the GUID on the device along with the checksum and compares the two pieces of data to the entries in the smart card cache on the computer. If the GUID of the device does not exist in the cache, or the GUID exists but the checksum differs, then the entire collection of settings must be transferred 26 from the device to the computer. If the GUID exists in the cache and if the checksum on the card matches the checksum of the settings stored in the cache, then the computer already has a current copy of the data and that data can be used instead of transferring it from the card.

If the data from the smart card is encrypted 30, then the PIN entered by the user is used to decrypt this data. Likewise, if the data from the smart card has been compressed 28, it is decompressed at this point. The compression of the settings allows for more information to be stored on the smart card and for faster transfer of information from the smart card to the computer. The use of compression provides a great advantage since smart card memory and settings transfer speed are vital to this invention.

The software then saves 32 all of the settings currently in use by the computer so that the system can revert back to these settings after the smart card user leaves the radius of the reader. The process of saving the current settings involves packaging the information into a file and writing it to the hard disk. The current settings are persisted to the disk to allow the restoration of the appropriate settings if the computer is not properly shutdown while smart card settings are active. After a user's current settings have been saved 32, the software reads the settings file retrieved from the smart card or from the settings cache and then activates the settings 34 on the current system. At this point users can see the settings changing, such as the wallpaper, window title bars and other settings that affect the visual interface. When all of the settings have been changed, users will be notified by the icon in the system tray. These new settings remain active until the smart card reader detects that the smart card is no longer present 50. The smart card is considered no longer present when the reader does not detect a smart card containing the GUID currently in use for a specified amount of time. This specified amount of time could be changed by the system administrator.

If users change the system settings while the smart card settings are active 36 they have the option to save these changes to the card 38, resulting in an updated preference set. Depending on a user's settings, these updated settings can be automatically transferred to the card or the user can be prompted whether to save the new settings or not. By default, any settings changes made when the smart card is active will automatically be saved to the card. This gives users the transparent non-interactive interface that this invention embodies. If there are new settings to be transferred to the card, the software collects these new settings 40 and prepares them for transfer to the card.

The first step in preparing the new data to be transferred to the card requires the computation of a new checksum value for the data to be written to the card. This checksum computation 40 can be performed using the well-known MD5 hash algorithm, or any other established hash algorithm. If a user has specified encryption for the data, the settings file is then encrypted 42. Likewise, if a user has specified compression, the data is then compressed 44. After these steps have been completed, the settings and checksum value are then transferred 46 to the smart card. These new settings and the checksum value are also transferred to the computer's settings cache 48 where they replace the previous information for this user.

After the reader determines that a smart card is no longer present 50, the system checks for the existence of original settings 52. If these settings are found, the software changes the system back to these original settings 54. At this point, if anyone is watching the computer, they will see the user interface elements affected by the smart card settings revert back to their original state. The icon in the system tray will notify the user that this transformation is taking place. When the transformation to the original settings is complete, the system tray icon will appear in the polling state 12, indicating that the system is again ready to accept smart card settings.

Figure 5:
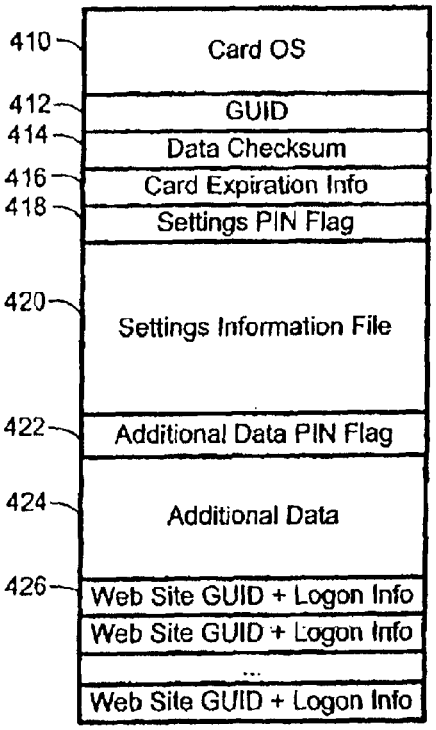
FIG. 5 illustrates a block diagram of a settings device layout of a smart card used in the present invention.

In addition to settings, the user is also given the capability to add to the list of items stored on the card. As shown in FIG. 5, a user defined storage area 424 will be provided with functionality allowing the user to transfer any data to the card they desire as long as the memory capacity of the card is not exceeded. For example, if the user has a particular document that they would like on the device but the current settings software does not include a function for this, then the user can specify that this document is to be stored in the user defined storage area 424. This gives the card ability to adapt for new settings and also the ability to store information besides settings. This user defined storage area can optionally be encrypted and protected by a PIN 422.

The security cautious user is given several options to provide different levels of protection for the information stored on the card. According to personal preferences the user has the option of requiring the entry of a PIN 18 prior to the transfer of information from the card to the computer. With this option enabled the information stored on the card is encrypted and can only be decrypted though the PIN. The user can either require a PIN for all data on the card or for only a subset of the data. For example, the user may allow the personalized settings to be automatically accessed but require a PIN to access a data file that has been stored in user defined storage area. The user is also given the option to set an expiration date 416 for the card. This allows the card to be used without entry of the PIN for specified amount of time. In order to use the card after this time has passed, the user must enter a PIN.

Figure 4:
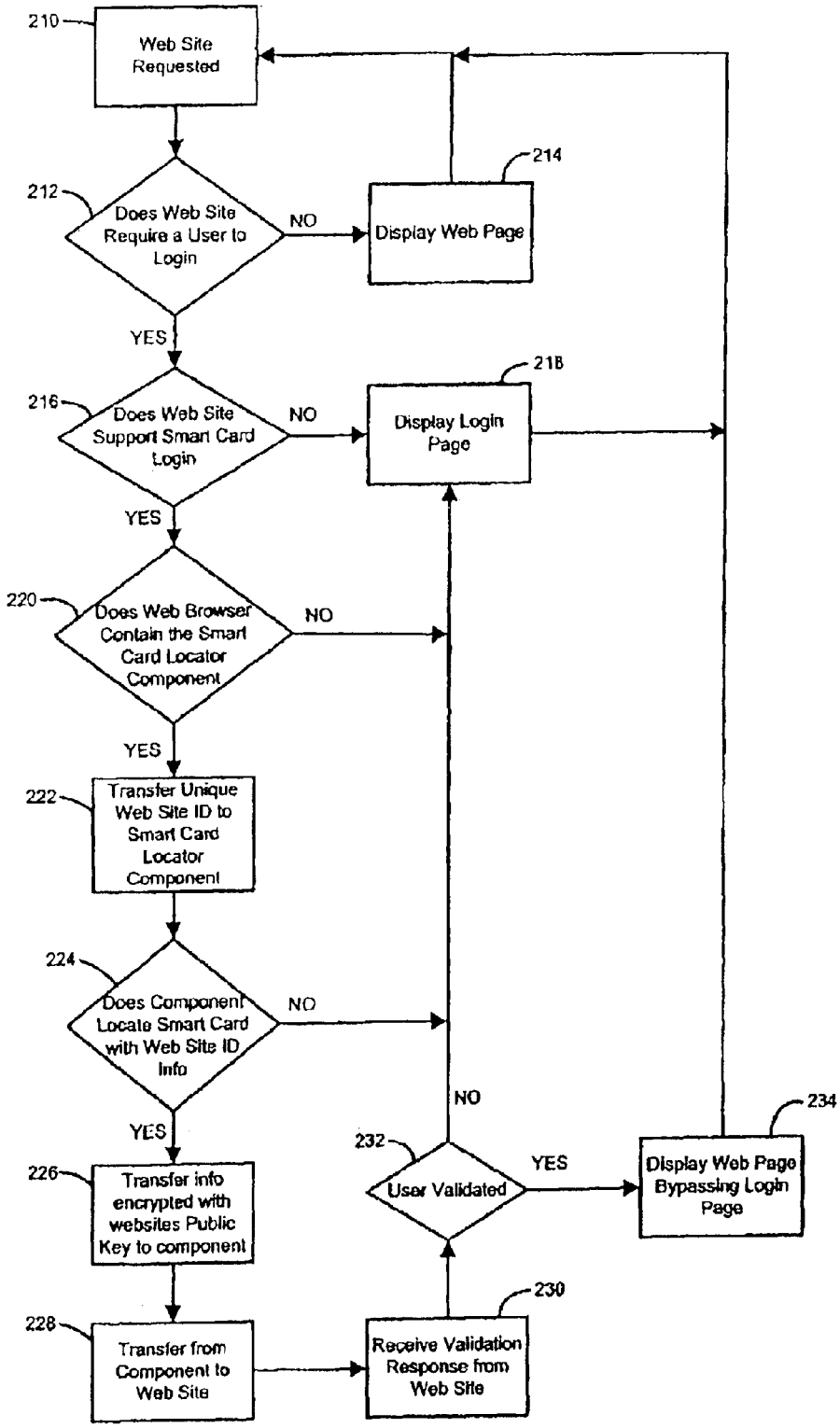
FIG. 4 is a flow diagram illustrating the log-in onto a web site using identification information from a smart card.

As shown in FIG. 4, when smart card settings are active and a user is on the Internet, the invention further enhances the experience by enabling a user to transparently logon to websites. Software is integrated with the web browser and the requested website to allow it to interact with the smart card and smart card reader. When a website is requested 210 that supports a smart card logon it sends a message 212 to the web browser to check if it contains the smart card locator component. If the web browser does not support a smart card logon, a normal logon page is displayed 214. If it does support a smart card logon 216, then the website transfers a unique website ID 222 to the smart card locator component. This website ID can be based off of a digital certificate owned by the website or it can be any form of a globally unique identifier. The browser then uses the smart card reader to check 224 if the smart card of the current user contains a matching ID for this website. If the smart card contains a matching ID the login information for that website is transferred 226 to the browser, which then transfers 228 the information to the website. This login information can be encrypted with the websites public key to prevent unauthorized users from accessing it. The website then decrypts the logon information with its private key. If the data results in a successful logon 232 information the website sends back a web page with the user already logged in 234. Otherwise the website sends back the normal logon web page 218.

After the installation of the smart card settings software, a graphical program can be run, enabling users to easily personalize their settings and then save those settings to a smart card. The software lets the user browse different categories of settings initialized to the values of the current computer system. A user is free to modify any of the values to obtain the desired environment. A user is free to either personalize all of the possible settings presented by the software or to only select a subset of these settings to travel with the smart card to other computers. The personalization software suspends the computer's ability to switch to smart card settings while it is running. This allows a users smart card to enter the range of the reader and have the current computer settings written to the card without the computer switching to the settings currently contained on the card.

Once the settings are modified as desired a user can press a button on the software interface that saves these settings to a smart card. A new GUID is generated and written to the card along with the settings information. After the settings have been saved, the personalization program can be exited and the card is now ready to be used on any computer running the smart card settings software. The personalization program can be repeated as many times as necessary on each card. The personalization program also allows the user to configure the smart card for logon to websites that support smart card logon.

Turning to the diagram in FIG. 5, the smart card contains an operating system 410 supplied by the manufacturer of the card. This operating system provides the smart card with the basic functionality needed to read from and write to the card. The operating system also provides the ability to encrypt and decrypt data. This invention involves several different customized sections of data on the card. A GUID 412 and a checksum 414 are written on the card to enable a caching system on the computer. The GUID uniquely identifies the user of the card while the checksum uniquely identifies the contents of the card.

The card expiration info 416 is used to determine when the card can no longer be freely accessed. If no date is specified then this option is not used. After the date contained in the card expiration is reached a PIN will be required for further access to the data. The card also contains two boolean flags. The settings PIN flag 418 notifies the computer if a PIN is required to access the settings on the card. The additional data PIN flag 422 notifies the computer if a PIN is required to access the additional data contained on the card. A series of website identifiers 426 and their corresponding logon information 426 are also stored on the card. This section of identifiers determines the web sites that can be transparently logged into when the computer is connected to the Internet. The additional data section 424 contains information the user has decided to store on the card. This can be any arbitrary data supplied by the user. The graphical settings personalization program will allow users to easily drag and drop files and other data onto an additional data section that will be written to the card. The settings information file 420 contains all of the settings that will automatically be transferred and activated when the card enters the range of a card reader.

In most cases, when a user first obtains a smart card it will not contain any settings information. The card will need to be configured to contain the users personal settings. However, it is possible to obtain preconfigured smart cards. These preconfigured cards can contain certain desktop themes or they can be preconfigured to aid people with certain disabilities so that no setup is required. For example, a user with colorblindness can buy a card that by default changes the computer to high contrast mode. Desktop theme cards would have a set of preferences stored on the card to give the computer a particular look and feel.

A user may have several different cards each configured for a different use. If a user frequently uses a computer for different tasks it may be beneficial to have different environments setup that best suit the current task. A user can populate the current environment with relevant email addresses and websites for a work environment on one card, and then have another card to populate the environment for recreational use. Business may also choose to give out preconfigured cards as a means of advertisement. The card can contain the company's website, email addresses, and other relevant information. For example, a restaurant can place their menu and address information on the card. When the customer wants more information than is printed on the card it can be brought into the range of the reader and the relevant information will become visible on the computer screen.

The present invention is not limited to use on a computer terminal, but can be used on any application device in which a smart card reader is equipped. Such application devices include Internet kiosks, telephones, televisions or any other device wherein personal preference settings are used.

It is to be understood that a preferred embodiment of the invention has been described and that various modifications thereto may be made by persons skilled in the art without departing from the spirit and scope of the invention as defined in the following claims.

I claim:

1. A method for establishing preference settings for a computer terminal during a user session, the computer terminal being coupled to a smart card reader configured to detect and access a smart card located within a predetermined zone of the smart card reader, the smart card carrying at least wholly self-contained personalized preference settings, at least one checksum summarizing the contents of the smart card and unique identification information, the method comprising the steps of:

the smart card reader detecting if a smart card is present within the predetermined zone;

wirelessly retrieving the at least one checksum and the unique identification information from the smart card to access the computer terminal;

validating the unique identification information retrieved from the smart card;

if the unique identification information is validated, providing a user with access and functionality to the computer terminal;

inspecting a preference cache within the computer terminal for a unique cache identifier and a cache checksum matching the unique identification information and the at least one checksum of the smart card, and assigning cached preference settings associated with the unique cache identifier and the cache checksum to the computer terminal to initiate the user session;

wherein if no matching unique cache identifier and cache checksum are found, the method further comprises;

conducting an information exchange to thereby initiate the user session, the information exchange including:

receiving and storing, at the computer terminal, the self-contained personalized preference settings contained on the smart card;

performing a preference establishment procedure to assign the self-contained personalized preference settings contained on the smart card to the computer terminal when the smart card is within the predetermined zone; and while the smart card is within the predetermined zone of the smart card reader, preventing the smart card reader from accessing additional smart cards within the predetermined zone of the smart card reader.

2. The method of claim 1, whereupon detecting the smart card, further comprising the steps of:

prompting a user for a password associated with the detected smart card;

receiving the password from a user; and determining that the password is associated with the unique identification information from the smart card and an authorized user of the computer terminal.

3. The method of claim 1, whereupon a determination is made that the self-contained personalized preference settings corresponding to the unique identification information do not correspond to the cached preference settings stored in the preference cache, further comprising the step of transferring the self-contained personalized preference settings on the smart card to the preference cache.

4. The method of claim 3, wherein the self-contained personalized preference settings are stored on the smart card as compressed preference data, said method further comprising the step of the computer terminal decompressing the compressed preference data.

5. The method of claim 3, wherein the self-contained personalized preference settings are stored on the smart card as encrypted preference data, said method further comprising the step of the computer terminal decrypting the encrypted preference data.

6. The method of claim 1, whereupon the smart card reader does not detect a smart card within a predetermined range, further comprising the steps of:

determining whether predetermined preference settings exist for the computer terminal;

reverting to the predetermined preference settings upon a determination thereof; and reverting to the last used preference settings upon a negative determination.

7. The method of claim 1, whereupon a user changes the preference settings during the user session, further comprising the step of:

saving the new preference settings to the smart card.

8. The method of claim 7, further comprising the steps of:

capturing the current settings and computing a new checksum;

transmitting and copying the new preference settings and the new checksum to the smart card; and storing the new preference settings in the preference cache.

9. The method of claim 1, wherein the computer terminal is connected to a network server system having a preference database, said method further comprising the step of:

transmitting the unique identification information to the server;

using the unique identification information to determine whether the cached preference settings corresponding to the unique identification information are stored on the server database; and temporarily assigning the cached preference settings determined to correspond to the unique identification information by the server to the computer terminal.

10. The method of claim 1, wherein a settings device layout of the smart card includes the card operating system, a global unique identifier (GUID), the at least one checksum, at least one password flag and preference settings information file.

11. The method of claim 10, wherein the preference settings information file includes keyboard settings, mouse settings, personal contact settings, internet browser settings, desktop settings, folder option settings and application settings.

12. A system for wirelessly setting personal preference settings on a computer terminal, the system comprising:

at least one smart card carrying self-contained personalized preference settings, at least one checksum summarizing the contents of the at least one smart card and unique identification information;

a computer terminal; and a smart card reader coupled to the computer terminal, said smart card reader configured to wirelessly detect a smart card within a predetermined zone surrounding the smart card reader;

wherein the smart card reader is arranged to wirelessly retrieve the at least one checksum and unique identification information from the smart card within the predetermined zone to permit a user to access the computer terminal;

wherein the computer terminal is configured to search a preference cache within the computer terminal for a unique cache identifier and a cache checksum matching the unique identification information and the at least one checksum of the smart card within the predetermined zone;

wherein cached preference settings associated with the unique cache identifier and the cache checksum are assigned to the computer terminal to initiate a user session;

wherein if no matching unique cache identifier and cache checksum are found, the smart card reader is arranged to permit an information exchange to thereby initiate a user session, the information exchange including the computer terminal receiving and storing the self-contained personalized preference settings contained on the smart card and performing a preference establishment procedure to temporarily assign the self-contained personalized preference settings contained on the smart card to the operating system of the computer terminal; and wherein the smart card reader is configured to access one smart card within the predetermined zone at a time.

13. The system according to claim 12, wherein a settings device layout of the smart card includes the card operating system, a global unique identifier (GUID), the at least one checksum, password flag and settings information file.

14. The system according to claim 13, wherein the settings information file includes keyboard settings, mouse settings, personal contact settings, internet browser settings, desktop settings, folder option settings and application settings.

15. The system according to claim 12, wherein the smart card reader has a smart card receptor configured and dimensioned to receive and contact the smart card to read data stored thereon directly therefrom.

16. The system according to claim 12, wherein the smart card reader is configured to poll the predetermined area at selected time intervals for the presence of any smart cards.

17. A system for wirelessly setting personal preference settings on an application device, the system comprising:

at least one smart card carrying self-contained personalized preference settings, at least one checksum summarizing the contents of the at least one smart card and identification information;

an application device; and a smart card reader coupled to the application device, said smart card reader configured to wirelessly detect a smart card within a predetermined zone surrounding the smart card reader;

wherein the smart card reader is arranged to wirelessly retrieve the at least one checksum and identification information to permit a user to access the application device;

wherein the application device is configured to search a preference cache within the application device for a unique cache identifier and a cache checksum matching the identification information and the at least one checksum of the smart card within the predetermined zone;

wherein cached preference settings associated with the unique cache identifier and the cache checksum are assigned to the application device to initiate a user session;

wherein if no matching unique cache identifier and cache checksum are found, the smart card reader is arranged to permit an information exchange to thereby initiate a user session, the information exchange including the application device receiving and storing the self-contained personalized preference settings contained on the smart card and performing a preference establishment procedure to temporarily assign the self-contained personalized preference settings contained on the smart card to an operating system of the application device; and wherein the smart card reader is configured to access one smart card within the predetermined zone at a time.

*18. A method for establishing preference settings for a computer terminal, the computer terminal being coupled to a smart card reader configured to detect and access a smart card located within a predetermined zone of the smart card reader, the smart card carrying at least wholly self-contained personalized preference settings, at least one checksum summarizing the contents of the smart card and unique identification information, the method comprising the steps of:*

*detecting if a smart card is present within the predetermined zone;*

*using at least one checksum and the unique identification information from the smart card to determine access to the computer terminal;*

*validating the unique identification information retrieved from the smart card;*

*if the unique identification information is validated, allowing access to the computer terminal;*

*inspecting a preference cache within the computer terminal for a unique cache identifier and a cache checksum matching the unique identification information and the at least one checksum of the smart card, and assigning cached preference settings associated with the unique cache identifier and the cache checksum to the computer terminal to initiate the user session;*

*wherein if no matching unique cache identifier and cache checksum are found, assigning the self-contained personalized preference settings contained on the smart card to the computer terminal; and*

*while the smart card is within the predetermined zone of the smart card reader, preventing the smart card reader from accessing additional smart cards within the predetermined zone of the smart card reader.*

*19. The method of claim 18, further comprising:*

*prompting a user for a password associated with the detected smart card;*

*receiving the password from the user; and*

*determining that the user is an authorized user of the computer terminal in response to determining that the password is associated with the unique identification information from the smart card.*

*20. The method of claim 18, further comprising transferring the self-contained personalized preference settings on the smart card to the preference cache.*

*21. The method of claim 18, wherein the self-contained personalized preference settings are stored on the smart card as compressed preference data and the method further comprises decompressing the compressed preference data at the computer terminal.*

*22. The method of claim 18, wherein the self-contained personalized preference settings are stored on the smart card as encrypted preference data and the method further comprises decrypting the encrypted preference data at the computer terminal.*

*23. The method of claim 18, wherein in response to not detecting a smart card within the predetermined zone, the method further comprises:*

*determining whether original preference settings exist for the computer terminal; and*

*reverting to the original preference settings in response to determining that original preference settings exist for the computer terminal.*

*24. The method of claim 18, further comprising:*

*receiving new preference settings from the user; and*

*saving the new preference settings to the smart card.*

*25. The method of claim 24, further comprising:*

*capturing current preference settings and computing a new checksum based on the current preference settings;*

*transmitting copying the new preference settings and the new checksum to the smart card; and*

*storing the new preference settings in the preference cache.*

*26. The method of claim 18, wherein the computer terminal is connected to a network server system having a preference database and the method further comprises:*

*transmitting the unique identification information to the server;*

*using the unique identification information to determine whether the cached preference settings corresponding to the unique identification information are stored on the server database; and*

*temporarily assigning the cached preference settings determined to correspond to the unique identification information by the server to the computer terminal.*

*27. The method of claim 18, wherein a settings device layout of the smart card includes one or more of a card operating system, a global unique identifier (GUID), the at least one checksum, at least one password flag and preference settings information file.*

*28. The method of claim 27, wherein the preference settings information file includes one or more of keyboard settings, mouse settings, personal contact settings, internet browser settings, desktop settings, folder option settings and application settings.*

*29. A system for setting personal preference settings on a computer terminal, the system comprising:*

*self-contained personalized preference settings, at least one checksum summarizing the contents of at least one smart card and unique identification information;*

*a computer terminal;*

*and a smart card reader coupled to the computer terminal, said smart card reader configured to retrieve the at least one checksum and unique identification information from the smart card within the predetermined zone;*

*wherein the computer terminal is configured to search a preference cache for a unique cache identifier and a cache checksum matching the unique identification information and the at least one checksum of the smart card within the predetermined zone;*

*wherein cached preference settings associated with the unique cache identifier and the cache checksum are assigned to the computer terminal to initiate a user session;*

*wherein if no matching unique cache identifier and cache checksum are found, the smart card reader is arranged to permit an information exchange including the computer terminal receiving and storing the self-contained personalized preference settings contained on the smart card indicating temporary assignment of the self-contained personalized preference settings contained on the smart card to the computer terminal; and*

*wherein the smart card reader is configured to access one smart card within the predetermined zone at a time.*

*30. A system for setting personal preference settings on an application device, the system comprising:*

*at least one smart card carrying self-contained personalized preference settings, at least one checksum summarizing the contents of the at least one smart card and identification information;*

*an application device; and*

*a smart card reader coupled to the application device, said smart card reader configured to detect a smart card within a predetermined zone surrounding the smart card reader;*

*at least one processor that processes the at least one checksum and identification information;*

*wherein the application device is configured to search a preference cache within the application device for a unique cache identifier and a cache checksum matching the identification information and the at least one checksum of the smart card within the predetermined zone;*

*wherein cached preference settings associated with the unique cache identifier and the cache checksum are assigned to the application device to initiate a user session;*

*wherein if no matching unique cache identifier and cache checksum are found, the application device is configured to receive and store the self-contained personalized preference settings contained on the smart card indicating temporary assignment of the self-contained personalized preference settings contained on the smart card to the application device; and*

*wherein the smart card reader is configured to access one smart card within the predetermined zone at a time.*

*31. A computer readable non-transitory medium storing software code thereon, the software code configured for execution by one or more processors of a computer terminal in order to cause the computer terminal to perform a method of establishing preference settings for a computer terminal, wherein the computer terminal is coupled to a smart card reader configured to detect and access a smart card, the smart card carrying at least wholly self-contained personal-*

*ized preference settings, at least one checksum summarizing the contents of the smart card, and unique identification information, the method comprising:*

*accessing the at least one checksum and the unique identification information from the smart card within a predetermined zone of the smart card reader;*

*inspecting a preference cache of the computer terminal for a unique cache identifier and a cache checksum matching the unique identification information and the at least one checksum of the smart card, respectively;*

*in response to identifying matching unique cache identifier and cache checksum in the preference cache, assigning cached preference settings associated with the unique cache identifier and the cache checksum to the computer terminal to initiate the user session;*

*in response to not identifying matching unique cache identifier and cache checksum, assigning the self-contained personalized preference settings contained on the smart card to the computer terminal; and*

*while the smart card is within the predetermined zone of the smart card reader, preventing the smart card reader from accessing additional smart cards within the predetermined zone of the smart card reader.*

*32. The computer readable non-transitory medium of claim 31, wherein the predetermined zone is within the smart card reader.*

*33. The computer readable non-transitory medium of claim 31, wherein the predetermined zone is an area of radio frequency communications.*

*34. The computer readable non-transitory medium of claim 31, wherein the self-contained personalized preference settings indicate one or more of keyboard settings, mouse settings, personal contact settings, internet browser settings, desktop settings, folder option settings and application settings.*

*35. The computer readable non-transitory medium of claim 31, wherein the unique identification information comprises a globally unique identifier that uniquely identifies the smart card.*

*36. The computer readable non-transitory medium of claim 31, wherein the method further comprises:*

*prompting a user for a password associated with the detected smart card;*

*receiving the password from the user;*

*determining that the password is associated with the unique identification information from the smart card; and*

*authorizing the user to access the computer terminal in response to determining that the password is associated with the unique identification information from the smart card.*

* * * * *

UNITED STATES PATENT AND TRADEMARK OFFICE

CERTIFICATE OF CORRECTION

PATENT NO. : RE42,102 E
APPLICATION NO. : 12/371465
DATED : February 1, 2011
INVENTOR(S) : Kopchik It is certified that error appears in the above-identified patent and that said Letters Patent is hereby corrected as shown below:

Column 9, line 55, in Claim 1, delete “comprises;” and insert -- comprises: --.

Column 10, line 51, in Claim 9, delete “step” and insert -- steps --.

Signed and Sealed this
Seventeenth Day of May, 2011

David J. Kappos

David J. Kappos
*Director of the United States Patent and Trademark Office*